US012608879B2

(12) United States Patent
Singhal et al.

(10) Patent No.: US 12,608,879 B2
(45) Date of Patent: Apr. 21, 2026

(54) GENERATION OF A 360-DEGREE OBJECT VIEW BY LEVERAGING AVAILABLE IMAGES ON AN ONLINE PLATFORM

(71) Applicant: Adobe Inc., San Jose, CA (US)

(72) Inventors: Gourav Singhal, New Delhi (IN); Tridib Das, Bangalore (IN); Sourabh Gupta, Noida (IN)

(73) Assignee: Adobe Inc., San Jose, CA (US)

( * ) Notice: Subject to any disclaimer, the term of this patent is extended or adjusted under 35 U.S.C. 154(b) by 463 days.

(21) Appl. No.: 18/079,579

(22) Filed: Dec. 12, 2022

(65) Prior Publication Data

US 2024/0193851 A1 Jun. 13, 2024

(51) Int. Cl.

| | |
|---|---|
| *G06T 15/20* | (2011.01) |
| *G06T 3/40* | (2006.01) |
| *G06T 5/70* | (2024.01) |
| *G06T 7/00* | (2017.01) |
| *G06V 10/10* | (2022.01) |

(Continued)

(52) U.S. Cl.
CPC .............. *G06T 15/205* (2013.01); *G06T 3/40* (2013.01); *G06T 5/70* (2024.01); *G06T 7/0002* (2013.01); *G06V 10/16* (2022.01); *G06V 10/751* (2022.01); *G06V 10/82* (2022.01); *G06V 20/50* (2022.01); *G06T 2200/24* (2013.01); *G06T 2207/20084* (2013.01); *G06T 2207/20192* (2013.01); *G06T 2207/30168* (2013.01)

(58) Field of Classification Search
CPC ........... G06T 15/205; G06T 5/70; G06T 3/40; G06T 7/0002; G06T 2200/24; G06T 2207/20084; G06T 2207/20192; G06T 2207/30168; G06V 10/82; G06V 10/751; G06V 10/16; G06V 20/50
See application file for complete search history.

(56) References Cited

U.S. PATENT DOCUMENTS 5,710,875 A * 1/1998 Harashima .............. G06T 15/10
345/419
5,742,294 A * 4/1998 Watanabe ............... G06T 15/00
345/672

(Continued)

OTHER PUBLICATIONS

Delta Faucet Essa Matte Black Kitchen Faucet Black, Kitchen Faucets with Pull Down Sprayer, Kitchen Sink Faucet, Faucet for Kitchen Sink, Magnetic Docking Spray Head, Matte Black 9113-BL-DSTDelta Faucet Store, Amazon.com, 1996-2022, 11 pages.

(Continued)

*Primary Examiner* — Charles L Beard
(74) *Attorney, Agent, or Firm* — Kilpatrick Townsend & Stockton LLP

(57) ABSTRACT

In some embodiments, a computing system generates a 360-degree view of a target object based on available images from an online platform. The computing system identifies a plurality of images having the same target object from one or more image sources on the online platform. The computing system categorizes the plurality of images into multiple view categories. The computing system then determines a representative image for each view category and generates a processed object image of the target object from the representative image for each view category. The computing system then stitches multiple processed object images to create a 360-degree view of the target object.

19 Claims, 10 Drawing Sheets

(51) Int. Cl.
*G06V 10/75*       (2022.01)
*G06V 10/82*       (2022.01)
*G06V 20/50*       (2022.01)

(56)       References Cited

U.S. PATENT DOCUMENTS

| | | | | |
|---|---|---|---|---|
| 5,977,978 | A * | 11/1999 | Carey | G06T 19/00 345/419 |
| 6,009,190 | A * | 12/1999 | Szeliski | G06T 3/4038 382/284 |
| 6,016,150 | A * | 1/2000 | Lengyel | G06T 15/04 345/589 |
| 6,281,904 | B1 * | 8/2001 | Reinhardt | G06T 15/04 345/589 |
| 6,363,169 | B1 * | 3/2002 | Ritter | G06T 17/10 382/154 |
| 6,417,850 | B1 * | 7/2002 | Kang | G06T 15/205 345/422 |
| 6,455,835 | B1 * | 9/2002 | Bernardini | G06T 7/564 356/613 |
| 6,614,429 | B1 * | 9/2003 | Zhang | G06T 7/246 382/154 |
| 6,750,873 | B1 * | 6/2004 | Bernardini | G06T 7/55 345/581 |
| 6,970,591 | B1 * | 11/2005 | Lyons | G06T 7/80 348/42 |
| 6,999,073 | B1 * | 2/2006 | Zwern | G06T 17/005 345/581 |
| 7,253,832 | B2 * | 8/2007 | Iwaki | G06T 7/564 348/E5.029 |
| 7,262,783 | B2 * | 8/2007 | Kramer | G09G 3/003 345/619 |
| 7,855,732 | B2 * | 12/2010 | Williams | G06F 3/04812 348/211.7 |
| 7,907,793 | B1 * | 3/2011 | Sandrew | G06T 11/001 348/576 |
| 8,270,704 | B2 * | 9/2012 | Kim | G06T 15/205 348/42 |
| 8,655,052 | B2 * | 2/2014 | Spooner | G06T 7/55 348/51 |
| 8,849,620 | B2 * | 9/2014 | Regan | G06F 30/00 702/167 |
| 8,965,121 | B2 * | 2/2015 | McNamer | G06T 11/001 382/167 |
| 9,288,476 | B2 * | 3/2016 | Sandrew | H04N 13/271 |
| 9,412,203 | B1 * | 8/2016 | Garcia, III | G06T 13/00 |
| 9,424,461 | B1 * | 8/2016 | Yuan | G06V 20/647 |
| 9,436,987 | B2 * | 9/2016 | Ding | G06T 7/11 |
| 9,479,768 | B2 * | 10/2016 | Yukich | H04N 13/393 |
| 9,501,719 | B1 * | 11/2016 | Horovitz | G06V 20/64 |
| 9,542,067 | B2 * | 1/2017 | Vats | G06F 3/017 |
| 9,728,010 | B2 * | 8/2017 | Thomas | G02B 27/0172 |
| 9,865,069 | B1 * | 1/2018 | Saporta | G06T 3/40 |
| 9,892,543 | B2 * | 2/2018 | Cao | G06T 19/20 |
| 9,911,242 | B2 * | 3/2018 | Sundaresan | H04N 1/60 |
| 9,922,437 | B1 * | 3/2018 | Baron | G06T 11/60 |
| 9,928,645 | B2 * | 3/2018 | Chuang | G06T 17/20 |
| 10,008,024 | B2 * | 6/2018 | Forutanpour | G06T 11/001 |
| 10,204,423 | B2 * | 2/2019 | Kim | G06T 7/75 |
| 10,304,203 | B2 * | 5/2019 | Forutanpour | G06T 17/00 |
| 10,326,972 | B2 * | 6/2019 | Zhang | G06T 7/55 |
| 10,382,739 | B1 * | 8/2019 | Rusu | G06V 20/20 |
| 10,445,798 | B2 * | 10/2019 | Sesti | G06T 19/003 |
| 10,587,865 | B2 * | 3/2020 | Choi | G06T 17/00 |
| 10,715,783 | B1 * | 7/2020 | Joshi | G06T 15/205 |
| 10,719,742 | B2 * | 7/2020 | Shechtman | G06N 3/0475 |
| 10,839,563 | B2 * | 11/2020 | Son | G06N 3/0455 |
| 11,024,065 | B1 * | 6/2021 | Baron | G06T 19/006 |
| 11,030,442 | B1 * | 6/2021 | Bergamo | G06F 18/214 |
| 11,055,910 | B1 * | 7/2021 | Deng | G06V 20/647 |
| 11,095,837 | B2 * | 8/2021 | Francois | G06T 7/246 |
| 11,636,685 | B1 * | 4/2023 | Volta | G05D 1/0255 382/103 |
| 11,640,692 | B1 * | 5/2023 | Gowda | G06T 7/194 345/419 |
| 11,651,602 | B1 * | 5/2023 | Tschernezki | G06V 10/803 382/157 |
| 11,669,988 | B1 * | 6/2023 | Miller | G06T 7/593 382/154 |
| 11,748,844 | B2 * | 9/2023 | Francois | G06T 5/50 382/284 |
| 11,856,282 | B2 * | 12/2023 | Scheich | H04N 13/239 |
| 11,856,299 | B2 * | 12/2023 | Scheich | G03B 15/07 |
| 11,875,447 | B1 * | 1/2024 | Tobenkin | G06T 17/00 |
| 11,922,575 | B2 * | 3/2024 | Arora | G06T 17/20 |
| 11,972,536 | B1 * | 4/2024 | Rong | G06T 19/20 |
| 12,026,892 | B2 * | 7/2024 | Brown | G06T 17/00 |
| 12,061,411 | B2 * | 8/2024 | Scheich | G03B 15/06 |
| 12,131,416 | B2 * | 10/2024 | Lombardi | G06T 7/97 |
| 12,190,524 | B2 * | 1/2025 | Beltrand | G06T 7/143 |
| 12,283,020 | B2 * | 4/2025 | Becker | G06T 19/20 |
| 2002/0050988 | A1 * | 5/2002 | Petrov | G06V 10/10 345/418 |
| 2002/0061130 | A1 * | 5/2002 | Kirk | G06T 7/55 382/154 |
| 2002/0064305 | A1 * | 5/2002 | Taylor | G06T 7/564 382/154 |
| 2002/0085219 | A1 * | 7/2002 | Ramamoorthy | H04N 19/61 358/1.9 |
| 2003/0117411 | A1 * | 6/2003 | Fujiwara | G06T 15/04 345/582 |
| 2003/0218607 | A1 * | 11/2003 | Baumberg | G06T 17/10 345/419 |
| 2004/0037459 | A1 * | 2/2004 | Dodge | G06T 17/00 382/154 |
| 2004/0155877 | A1 * | 8/2004 | Hong | G06T 7/11 345/419 |
| 2005/0128197 | A1 * | 6/2005 | Thrun | G06T 7/55 345/421 |
| 2006/0017722 | A1 * | 1/2006 | Hong | G06T 15/04 345/582 |
| 2007/0183669 | A1 * | 8/2007 | Owechko | G06F 18/254 382/224 |
| 2007/0285514 | A1 * | 12/2007 | Perlman | H04N 23/90 348/169 |
| 2008/0292180 | A1 * | 11/2008 | Kobayashi | G06T 7/12 382/154 |
| 2009/0040224 | A1 * | 2/2009 | Igarashi | G06T 19/00 345/427 |
| 2009/0174701 | A1 * | 7/2009 | Cotter | G06T 7/596 348/42 |
| 2011/0007072 | A1 * | 1/2011 | Khan | G06T 7/564 345/420 |
| 2012/0162215 | A1 * | 6/2012 | Cha | G06T 11/001 345/419 |
| 2013/0156259 | A1 * | 6/2013 | Hirano | G06T 1/0007 382/100 |
| 2013/0286012 | A1 * | 10/2013 | Medioni | G06T 7/00 345/420 |
| 2013/0301906 | A1 * | 11/2013 | Yoon | G06T 7/529 382/154 |
| 2014/0022248 | A1 * | 1/2014 | Kuffner, Jr. | G06T 17/20 345/420 |
| 2014/0037189 | A1 * | 2/2014 | Ziegler | G06F 21/575 382/154 |
| 2014/0099022 | A1 * | 4/2014 | McNamer | G06T 11/001 382/167 |
| 2014/0132594 | A1 * | 5/2014 | Gharpure | H04N 13/279 345/419 |
| 2015/0015581 | A1 * | 1/2015 | Lininger | G06T 15/503 345/426 |
| 2015/0276379 | A1 * | 10/2015 | Ni | G01B 11/022 382/154 |
| 2015/0363971 | A1 * | 12/2015 | Pan | G06T 7/593 345/420 |
| 2015/0381968 | A1 * | 12/2015 | Arora | G06T 17/00 348/47 |
| 2016/0005211 | A1 * | 1/2016 | Sarkis | G06T 1/0007 345/419 |

(56) References Cited

U.S. PATENT DOCUMENTS

| | | | | |
|---|---|---|---|---|
| 2016/0086379 A1* | 3/2016 | Sadi | | G02B 27/0093 |
| | | | | 345/633 |
| 2016/0088287 A1* | 3/2016 | Sadi | | H04N 13/117 |
| | | | | 348/43 |
| 2016/0150217 A1* | 5/2016 | Popov | | H04N 13/257 |
| | | | | 348/47 |
| 2016/0321838 A1* | 11/2016 | Barone | | G06T 5/50 |
| 2017/0046868 A1* | 2/2017 | Chernov | | G06T 7/246 |
| 2017/0064200 A1* | 3/2017 | Castillo | | H04N 13/221 |
| 2017/0161590 A1* | 6/2017 | Boulkenafed | | G06F 18/22 |
| 2017/0178392 A1* | 6/2017 | Zuccarino | | G06T 15/205 |
| 2017/0180756 A1* | 6/2017 | Tuffreau | | H04N 13/161 |
| 2017/0208245 A1* | 7/2017 | Castillo | | H04N 1/2104 |
| 2017/0251143 A1* | 8/2017 | Peruch | | H04N 13/243 |
| 2017/0302902 A1* | 10/2017 | Martinello | | H04N 13/254 |
| 2017/0372527 A1* | 12/2017 | Murali | | H04N 13/239 |
| 2018/0005079 A1* | 1/2018 | Tosic | | G06F 18/2414 |
| 2018/0046649 A1* | 2/2018 | Dal Mutto | | G06N 3/0464 |
| 2018/0047208 A1* | 2/2018 | Marin | | H04N 13/257 |
| 2018/0089888 A1* | 3/2018 | Ondruska | | G06T 7/73 |
| 2018/0101966 A1* | 4/2018 | Lee | | H04N 21/6587 |
| 2018/0114264 A1* | 4/2018 | Rafii | | G06T 15/50 |
| 2018/0130255 A1* | 5/2018 | Hazeghi | | H04N 13/271 |
| 2018/0211404 A1* | 7/2018 | Zhu | | G06T 7/579 |
| 2018/0234671 A1* | 8/2018 | Yang | | G06T 15/205 |
| 2019/0019327 A1* | 1/2019 | Popov | | G06F 16/583 |
| 2019/0026917 A1* | 1/2019 | Liao | | G06T 7/50 |
| 2019/0026958 A1* | 1/2019 | Gausebeck | | G06T 7/579 |
| 2019/0066364 A1* | 2/2019 | Chui | | G06T 15/205 |
| 2019/0080506 A1* | 3/2019 | Chui | | G06T 5/50 |
| 2019/0089898 A1* | 3/2019 | Kim | | G06V 10/82 |
| 2019/0096135 A1* | 3/2019 | Dal Mutto | | G06F 18/24765 |
| 2019/0114807 A1* | 4/2019 | Saa-Garriga | | G06T 9/002 |
| 2019/0128670 A1* | 5/2019 | Chen | | G01C 11/025 |
| 2019/0251702 A1* | 8/2019 | Chandler | | G06F 3/017 |
| 2019/0289327 A1* | 9/2019 | Lin | | G06N 3/0464 |
| 2019/0332866 A1* | 10/2019 | Beall | | H04N 23/698 |
| 2019/0362539 A1* | 11/2019 | Kurz | | G06T 7/40 |
| 2019/0385357 A1* | 12/2019 | Chui | | G06F 16/58 |
| 2020/0021791 A1* | 1/2020 | Hur | | H04N 21/6587 |
| 2020/0160616 A1* | 5/2020 | Li | | G06N 3/094 |
| 2020/0258196 A1* | 8/2020 | Kokura | | G06T 5/50 |
| 2020/0258300 A1* | 8/2020 | Schwarz | | G06T 11/006 |
| 2020/0312034 A1* | 10/2020 | Berthomier | | G06T 19/006 |
| 2020/0336719 A1* | 10/2020 | Morisawa | | H04N 13/239 |
| 2020/0364923 A1* | 11/2020 | Popov | | G06T 19/003 |
| 2020/0372626 A1* | 11/2020 | Dal Mutto | | G06T 17/00 |
| 2020/0372659 A1* | 11/2020 | Hagiopol | | G06T 7/564 |
| 2021/0090242 A1* | 3/2021 | Hever | | G06T 17/20 |
| 2021/0103776 A1* | 4/2021 | Jiang | | G06T 19/20 |
| 2021/0118219 A1* | 4/2021 | Chui | | G06T 17/00 |
| 2021/0124960 A1* | 4/2021 | Lee | | G06N 3/0464 |
| 2021/0144278 A1* | 5/2021 | Li | | G02B 5/3033 |
| 2021/0166477 A1* | 6/2021 | Bunkasem | | G06V 10/774 |
| 2021/0182947 A1* | 6/2021 | Wade | | G06Q 30/0631 |
| 2021/0192658 A1* | 6/2021 | Masuda | | G06V 10/243 |
| 2021/0201039 A1* | 7/2021 | Frei | | G06V 20/46 |
| 2021/0225017 A1* | 7/2021 | Holzer | | G06N 3/0464 |
| 2021/0248811 A1* | 8/2021 | Shan | | G06N 3/045 |
| 2021/0279967 A1* | 9/2021 | Gernoth | | G06V 10/255 |
| 2021/0304402 A1* | 9/2021 | Morgas | | G06N 20/00 |
| 2021/0312702 A1* | 10/2021 | Holzer | | G06T 7/70 |
| 2021/0374986 A1* | 12/2021 | Nicastro | | G06V 20/10 |
| 2021/0383115 A1* | 12/2021 | Alon | | A63F 13/77 |
| 2022/0036050 A1* | 2/2022 | Chandler | | G06V 40/28 |
| 2022/0036635 A1* | 2/2022 | Li | | G06T 7/70 |
| 2022/0051433 A1* | 2/2022 | Sohn | | G06V 20/64 |
| 2022/0130126 A1* | 4/2022 | Delgado | | G06T 7/521 |
| 2022/0198753 A1* | 6/2022 | Sawhney | | G06T 19/00 |
| 2022/0245890 A1* | 8/2022 | Fialko | | G01B 11/24 |
| 2022/0254008 A1* | 8/2022 | Holzer | | G06T 7/85 |
| 2022/0300738 A1* | 9/2022 | Hu | | G06V 20/64 |
| 2022/0301224 A1* | 9/2022 | Zhang | | G06T 7/75 |
| 2022/0343660 A1* | 10/2022 | Yang | | G06V 10/70 |
| 2023/0032731 A1* | 2/2023 | Hörndler | | A61B 6/032 |
| 2023/0052169 A1* | 2/2023 | George | | G06T 17/00 |
| 2023/0063215 A1* | 3/2023 | Kadam | | H04N 13/282 |
| 2023/0121534 A1* | 4/2023 | Rukhovich | | G06T 7/70 |
| | | | | 382/103 |
| 2023/0177771 A1* | 6/2023 | Assarsson | | G06T 15/06 |
| | | | | 345/420 |
| 2023/0186562 A1* | 6/2023 | Yun | | G06T 7/55 |
| | | | | 345/418 |
| 2023/0239574 A1* | 7/2023 | Dzitsiuk | | H04N 23/80 |
| | | | | 348/207.99 |
| 2023/0342820 A1* | 10/2023 | Frei | | G06V 10/82 |
| 2023/0377047 A1* | 11/2023 | Bouetté | | G06V 10/82 |
| 2024/0029455 A1* | 1/2024 | Xiong | | G06V 10/774 |
| 2024/0037769 A1* | 2/2024 | Atwood | | G06V 20/64 |
| 2024/0096020 A1* | 3/2024 | Yu | | G06T 7/194 |
| 2024/0119666 A1* | 4/2024 | Shin | | G06V 10/764 |
| 2024/0135632 A1* | 4/2024 | Ahn | | G06T 15/06 |
| 2024/0153046 A1* | 5/2024 | Mirzaei | | G06T 5/60 |
| 2024/0163414 A1* | 5/2024 | Kimura | | H04N 21/234 |
| 2024/0171721 A1* | 5/2024 | Peeters | | H04N 23/90 |
| 2024/0203020 A1* | 6/2024 | Thomas | | G06T 15/00 |
| 2024/0203069 A1* | 6/2024 | Kim | | G06F 3/0346 |
| 2024/0223742 A1* | 7/2024 | Xiong | | G06T 19/006 |
| 2024/0242451 A1* | 7/2024 | Yu | | G06T 7/70 |
| 2024/0244322 A1* | 7/2024 | Watson | | H04N 23/6812 |
| 2024/0265570 A1* | 8/2024 | Shirguppe | | G06T 7/55 |
| 2024/0312166 A1* | 9/2024 | Kasahara | | G06T 15/10 |
| 2024/0331349 A1* | 10/2024 | Wajjala | | G06F 18/22 |
| 2024/0354903 A1* | 10/2024 | Reid | | G06T 13/80 |
| 2024/0355062 A1* | 10/2024 | Ngai | | G06V 10/82 |
| 2024/0394964 A1* | 11/2024 | Baek | | G06V 10/60 |
| 2025/0069318 A1* | 2/2025 | Maschmeyer | | G06T 7/11 |
| 2025/0078334 A1* | 3/2025 | Farris | | G06V 20/20 |
| 2025/0078393 A1* | 3/2025 | Tan | | G06T 17/00 |
| 2025/0078401 A1* | 3/2025 | Biswas | | G06T 7/20 |
| 2025/0182397 A1* | 6/2025 | Cao | | G06T 17/00 |
| 2025/0184581 A1* | 6/2025 | Shi | | G06T 13/20 |

OTHER PUBLICATIONS

Facebook Now Lets You Turn Any 2D Photo into a 3D Image Using AI, Available online at https://petapixel.com/2020/02/28/facebook-now-lets-you-turn-any-2d-photo-into-a-3d-image-using-ai/, Feb. 28, 2020, pp. 1-14.

Product 360 View, Available online at https://marketplace.magento.com/webkul-product-360-view.html, Accessed from internet on Dec. 5, 2022, pp. 1-9.

Publish 360 Views from Your 3D Modeling Software, Available online at https://www.imajize.com/360-guides-tutorials/publish-360-views-from-your-3d-modeling-software/, 2018, 7 pages.

REDMI 9i (Sea Blue, 128 GB) (4 GB RAM), Available online at https://www.flipkart.com/redmi-9i-sea-blue-128-gb/p/itm43109f906a87c?pid=MOBFV8RYVXTGYFVM&lid=LSTMOBFV8RYVXTGYFVMJPH7CL&mark, Accessed from internet on Dec. 5, 2022, pp. 1-4.

The World's Finest 360 Degree Product Viewer, Sirv, Available online at https://sirv.com/features/360-product-viewer/, Accessed from internet on Dec. 5, 2022, pp. 1-6.

Top 6 Statistics About 360-Degree Photography You Should Know—Rip Roarin Productions, Available online at https://www.riproarinproductions.com/blog/post/top-6-statistics-about-360degree-photography-you-should-know, Accessed from internet on Dec. 5, 2022, pp. 1-6.

Why 360 Product Viewers Will Soon Be the eCommerce Standard, Available online at https://www.threekit.com/blog/360-product-viewer, Accessed from internet on Dec. 5, 2022, pp. 1-21.

Ortery, 5 Reasons Why Businesses Need 360 Product Photography, Available online at https://www.ortery.com/5-reasons-why-businesses-need-360-product-photography/, Feb. 4, 2015, pp. 1-3.

Roggio, Even in 2020, 360-degree Product Photos Boost Conversions, Available online at https://www.practicalecommerce.com/even-in-2020-360-degree-product-photos-boost-conversions, May 27, 2020, pp. 1-5.

(56)            References Cited

OTHER PUBLICATIONS

Verzosa, How to Shoot 360 Product Photography, Available online at https://expertphotography.com/360-product-photography/, Accessed from internet on Dec. 5, 2022, pp. 1-17.

* cited by examiner

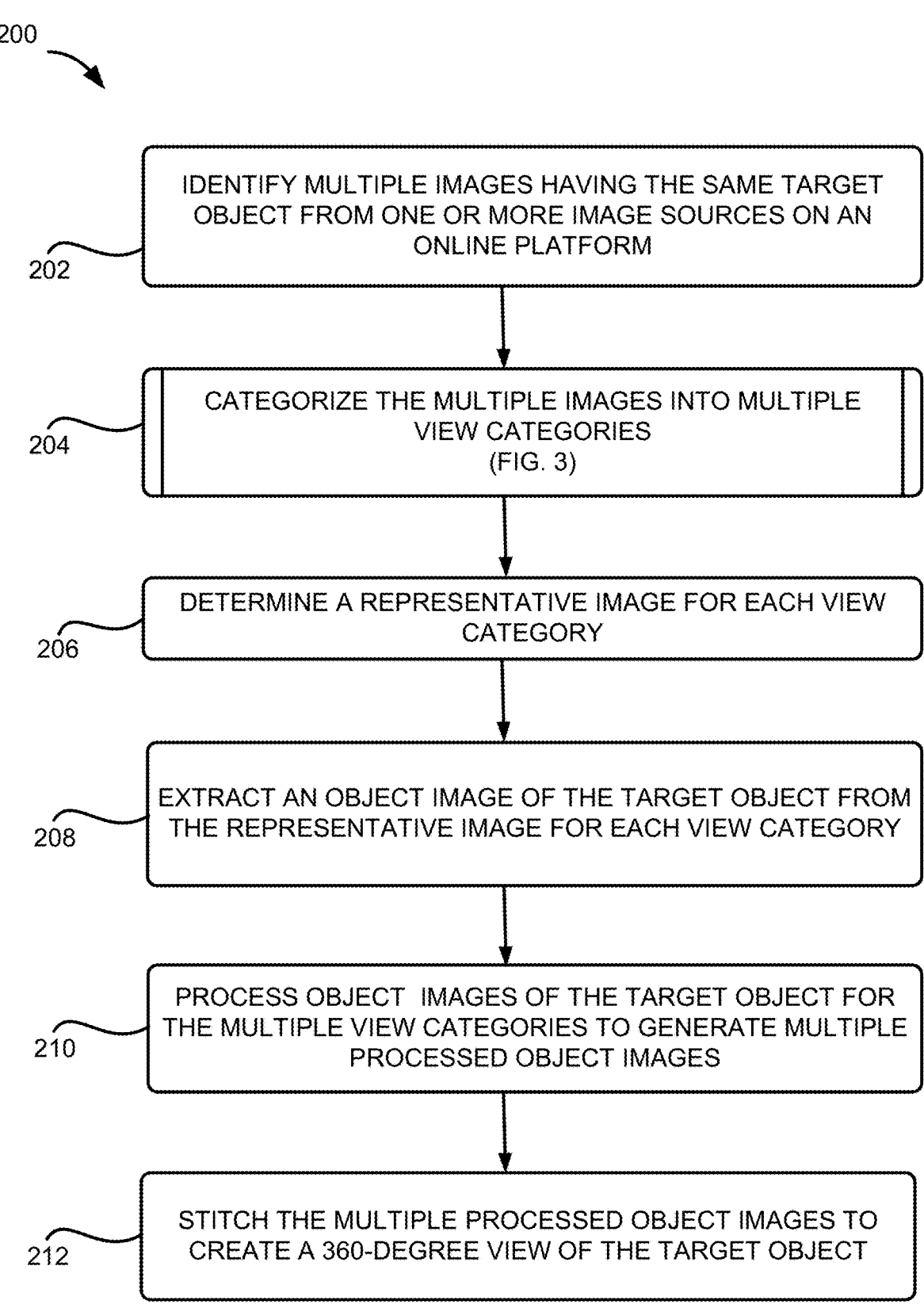

200

202 — IDENTIFY MULTIPLE IMAGES HAVING THE SAME TARGET OBJECT FROM ONE OR MORE IMAGE SOURCES ON AN ONLINE PLATFORM

204 — CATEGORIZE THE MULTIPLE IMAGES INTO MULTIPLE VIEW CATEGORIES (FIG. 3)

206 — DETERMINE A REPRESENTATIVE IMAGE FOR EACH VIEW CATEGORY

208 — EXTRACT AN OBJECT IMAGE OF THE TARGET OBJECT FROM THE REPRESENTATIVE IMAGE FOR EACH VIEW CATEGORY

210 — PROCESS OBJECT IMAGES OF THE TARGET OBJECT FOR THE MULTIPLE VIEW CATEGORIES TO GENERATE MULTIPLE PROCESSED OBJECT IMAGES

212 — STITCH THE MULTIPLE PROCESSED OBJECT IMAGES TO CREATE A 360-DEGREE VIEW OF THE TARGET OBJECT

FIG. 2

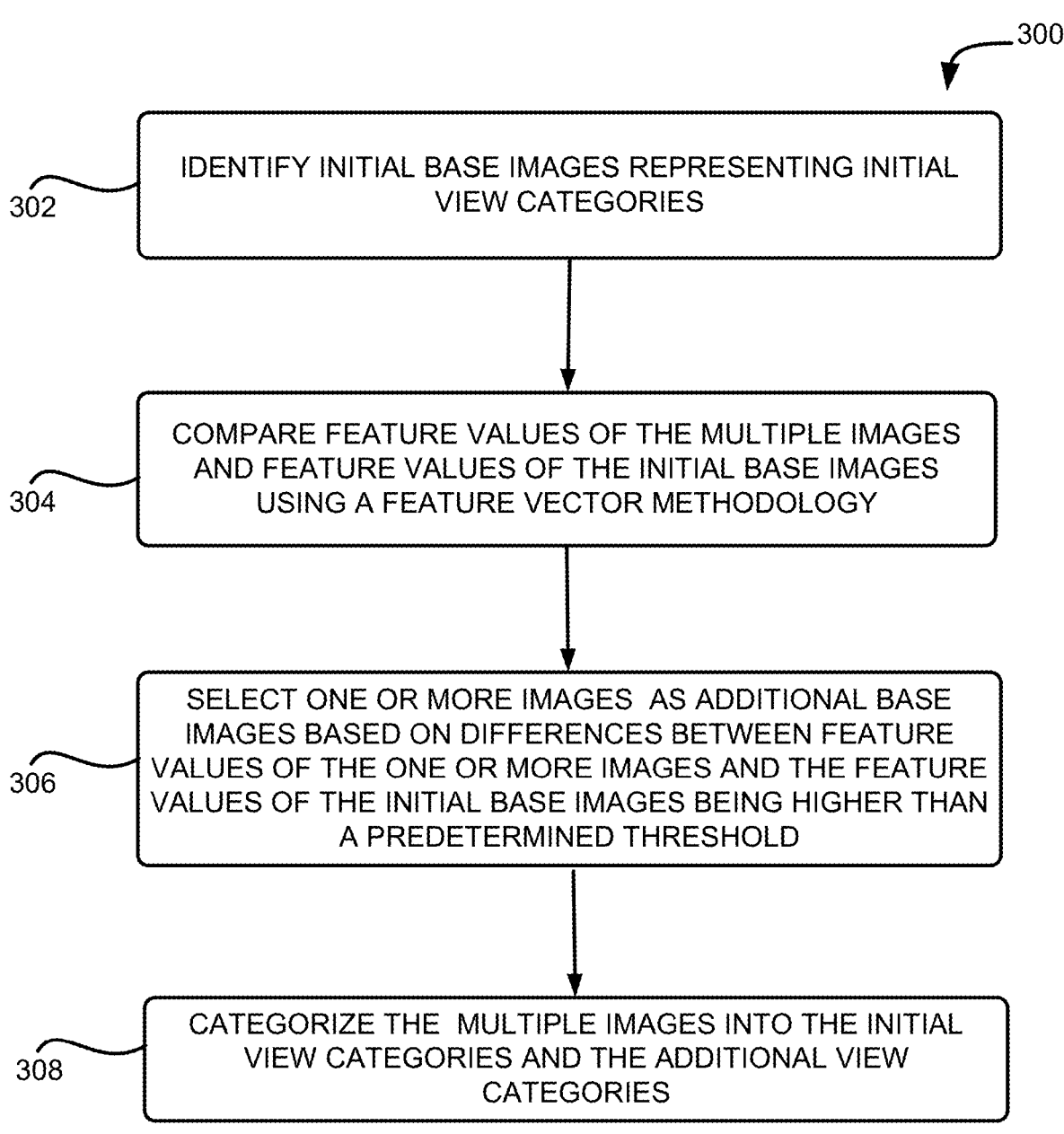

300

302    IDENTIFY INITIAL BASE IMAGES REPRESENTING INITIAL
       VIEW CATEGORIES

304    COMPARE FEATURE VALUES OF THE MULTIPLE IMAGES
       AND FEATURE VALUES OF THE INITIAL BASE IMAGES
       USING A FEATURE VECTOR METHODOLOGY

306    SELECT ONE OR MORE IMAGES  AS ADDITIONAL BASE
       IMAGES BASED ON DIFFERENCES BETWEEN FEATURE
       VALUES OF THE ONE OR MORE IMAGES AND THE FEATURE
       VALUES OF THE INITIAL BASE IMAGES BEING HIGHER THAN
       A PREDETERMINED THRESHOLD

308    CATEGORIZE THE  MULTIPLE IMAGES INTO THE INITIAL
       VIEW CATEGORIES AND THE ADDITIONAL VIEW
       CATEGORIES

*FIG. 3*

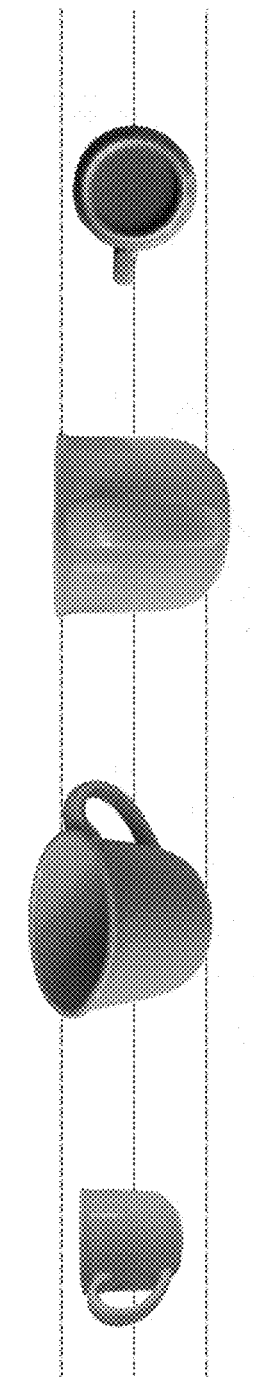
*FIG. 9*
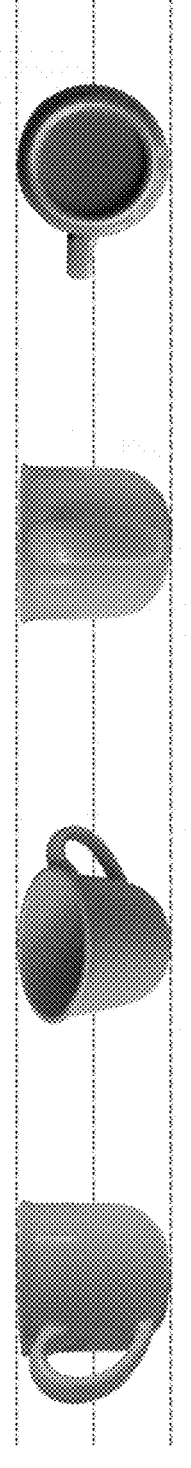
*FIG. 10*

GENERATION OF A 360-DEGREE OBJECT VIEW BY LEVERAGING AVAILABLE IMAGES ON AN ONLINE PLATFORM

TECHNICAL FIELD

This disclosure relates generally to image processing. More specifically, but not by way of limitation, this disclosure relates to generating a 360-degree object view by leveraging images of the object available on an online platform, such as user uploaded images.

BACKGROUND

The advancement of digital technologies and platforms allows users to perform various actions from anywhere in a fraction of seconds in the virtual space, such as attending virtual exhibition or conducting interactions. Static images provided on these online platforms provide a limited view of an object. Due to the virtual nature of the online platform where the users could not view the object in person, it is desirable to provide as much information about the object as possible to the users. Some of the solutions are to generate an interactive 360-degree object view.

Existing approaches for compiling 360-view images involve manual processes of capturing multiple photographs of an object from various angles. In addition, these approaches require very refined photos which need to be captured in a consistent environment and require specific types of hardware setups. If any of these conditions are not met, the resulting 360-degree view will have poor quality and affect user interaction with the objects.

SUMMARY

Certain embodiments involve generating a 360-degree object view by leveraging images of the object available on an online platform. In one example, a computing system for generating a 360-degree view of a target object identifies multiple images having the same target object from one or more image sources on the online platform. The computing system categorizes the multiple images into multiple view categories. The computing system then determines a representative image for each view category, extracts an object image for the target object from the representative image for each view category, and processes the object image for each view category. The computing system then stitches multiple processed object images to create a 360-degree view of the target object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a process for generating a 360-degree object view from individual images of a target object that are available on the online platform, according to certain embodiments of the present disclosure.

FIG. 3 depicts an example of a process for categorizing multiple images into multiple view categories, according to certain embodiments of the present disclosure.

FIG. 9 depicts another example of extracted object images of another target object from available images on the online platform, according to certain embodiments of the present disclosure.

FIG. 10 depicts examples of scaled and processed object images generated by scaling and enhancing the extracted object images shown in FIG. 9, according to certain embodiments of the present disclosure.

DETAILED DESCRIPTION

Figure 1:
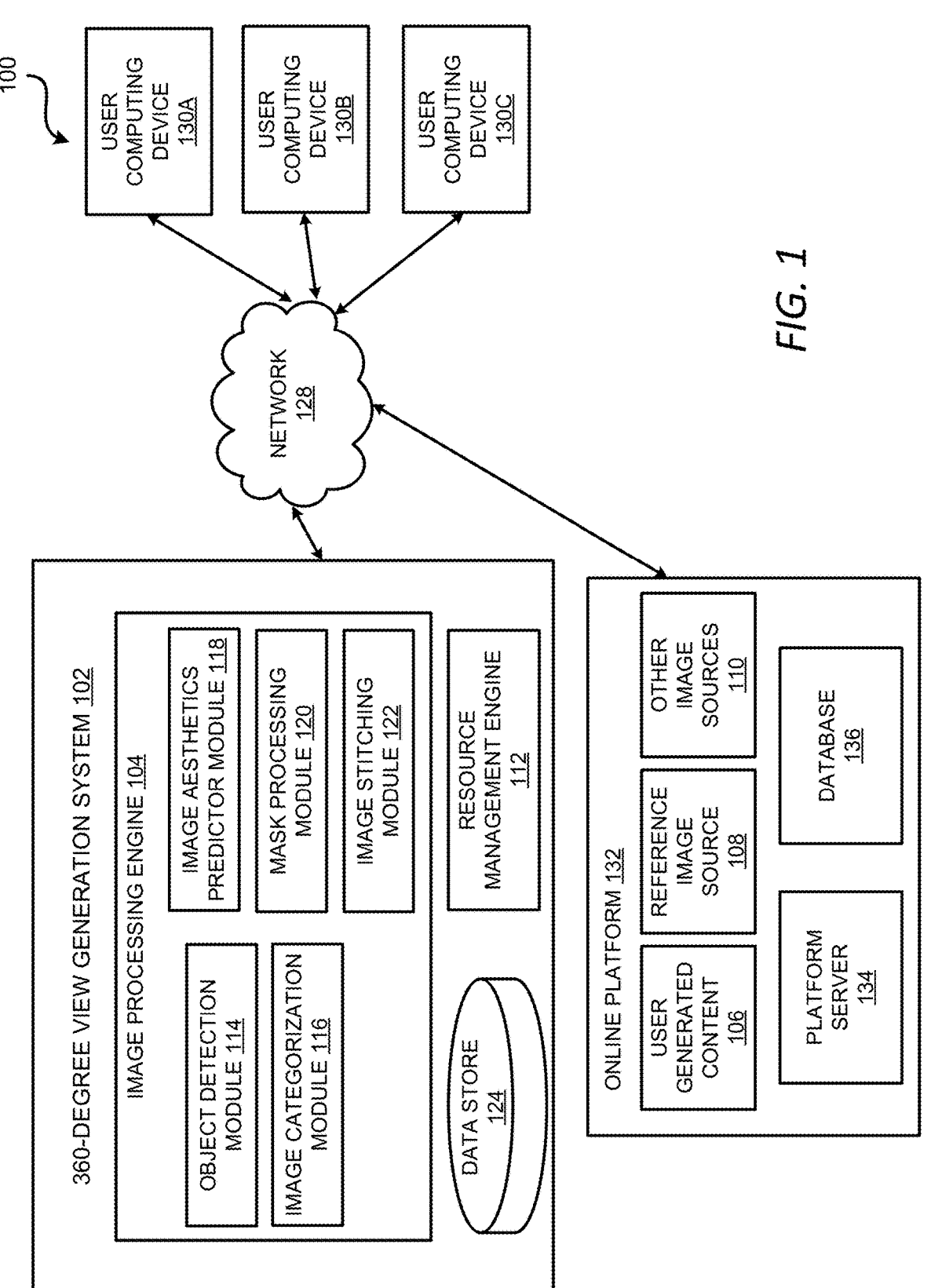
FIG. 1 depicts an example of a computing environment in which a 360-degree view generation system generates a 360-degree object view using available images on an online platform, according to certain embodiments of the present disclosure.

Certain embodiments involve generating a 360-degree object view by leveraging images of the object available on an online platform. For instance, a 360-degree view generation system identifies multiple images of the same target object from one or more image sources on an online platform, such as user generated or uploaded content. The 360-degree view generation system categorizes the multiple images into multiple view categories. A representative image for each view category can be determined. The 360-degree view generation system extracts an object image of the target object from the representative image for each view category by removing the background content in the original image. The object image for each view category is then processed and stitched together to create a 360-degree view of the target object.

The following non-limiting example is provided to introduce certain embodiments. In this example, a 360-degree view generation system obtains available images having the same target object on an online platform. The available images may include user uploaded images, reference images, and images from other sources that are available on the online platform. An object detection model, such as Convolutional Neural Network (CNN)-based object detection model, is used to detect the target object from the available images. The object detection model labels the target object in each image and creates a bounding box for the target object in each image. Low quality images, such as images in which the object is partially visible, not visible, or blurry, are filtered out.

The 360-degree view generation system then categorizes the remaining images. An image categorization module of the computing system utilizes the reference images as base images and compares the remaining images with the base images based on feature values of the respective images. If the difference between a feature value of a specific image and respective feature values of the base images is higher than a predetermined threshold value, the specific image is considered as a new base image, i.e., another angle/view of the target object. Continuing the process for other images, additional base images can be identified to represent other possible views of the target object. The images are then categorized into a set of view categories associated with various views or angles of the target object.

The 360-degree view generation system then determines a representative image for each view category. An image having the highest aesthetic quality score among the images in each view category (i.e., a particular angle or view of the target object) is selected as a representative image for each view category. The image aesthetic quality score is calculated using several aesthetic attributes, such as interesting content, object emphasis, good lighting, etc.

The 360-degree view generation system further extracts an object image of the target object from the representative image for each view category by removing the background from the representative image. Because the images are obtained from various sources on the online platform (e.g., images are taken and uploaded by different users and may be taken at different distances), the extracted object images may not be at the same scale. The mask processing module then adjusts the object images to the same defined scale. Object images smaller than the defined scale is upscaled and object image bigger than the defined scale is downscaled. The mask processing module then enhances the scaled object images to make the look-and-feel of the images similar to each other by, for example, adjusting the lighting, contrast, color saturation, etc.

After processing the object images by scaling and enhancing, the 360-degree view generation system stitches the processed object images together to create a 360-degree view of the target object. The 360-degree view can be refined by performing post-processing to reduce artefacts created during the stitching.

As discussed above, certain embodiments of the present disclosure overcome the disadvantages of the prior art, by automatically creating a 360-degree object view by leveraging existing images that are already available on an online platform. The proposed process allows images from different sources with different qualities to be used to create a coherent 360-degree object view. For example, the filtering operation and the process of selecting the representative image in each view category facilitate the removal of low-quality images and the selection of high-quality images; the scaling process enables the images to be processed to be on the same scale; and the enhancing step makes the look-and-feel of the images to be consistent before stitching.

This series of processes allows various images to be used in the generation of the 360-degree view even if they do not satisfy the stringent requirements as specified in the existing approaches. As a result, the requirement of using refined images of the object as input can be eliminated and the overall computational complexity of the 360-degree view generation process is reduced. Further, because there is no longer a need to wait for the refined images of an object to be available before generating the 360-degree view, the time for generating the view can be reduced significantly. As more images are available to the online platform, the proposed processes can be carried out from time to time to continuously improve the quality of the generated 360-degree object view.

As used herein, the term "360-degree object view" or "360-degree view of a target object" is used to refer to an interactive image that every side of the target object can be viewed in a 360-degree full circle. For example, a 360-degree view of a target object can be rotated around a horizontal axis of the target object, around a vertical axis of the target object, or around an axis with any angle between the horizontal axis and the vertical axis.

As used herein, the term "object image" is used to refer to an image having the target object only. For example, an image only having the target object can be extracted from a user generated image, which may have other content besides the target object, by applying a mask to the user generated image.

As used herein, the term "reference image" is used to refer to an image of a target object that has a relative high quality. For example, the reference image may be an image uploaded by a provider of the target object, an image captured using a high-resolution camera, and the like. In some scenarios, multiple reference images may be provided by the provider of the target object showing the target object from different viewpoints and can be used as base images for image categorization.

As used herein, the term "aesthetic attributes" is used to refer to variables that affect the aesthetics of an image. For example, aesthetic attributes can include content attributes (e.g., attributes indicating whether the image has good or interesting content), color harmony attributes (e.g., attributes indicating where the overall color of the image is harmonious), and lighting attributes (e.g., attributes indicating whether the image has good lighting).

As used herein, the term "keypoints" is used to refer to spatial locations or points representing certain features of an object in an image. For examples, keypoints can be the locations of corners of an object.

As used herein, the term "descriptor" is used to refer to a quantitative value describing a feature (e.g., corner, edge, regions of interest point, ridge) of an object in an image. In some examples, a descriptor is a numerical value describing a feature (e.g., a corner) of an object. In some examples, a descriptor is a vector of numerical values describing various features of an object.

Referring now to the drawings, FIG. 1 is an example of a computing environment 100 in which a 360-degree view generation system 102 employs an image processing engine 104 to generate a 360-degree view using available images of a target object on an online platform 132. In various embodiments, the computing environment 100 includes a 360-degree view generation system 102 connected with the online platform 132 via a network 128. The computing environment 100 is configured for facilitating access to 360-degree object views in the 360-degree view generation system 102 or on the online platform 132 by one or more user computing devices 130A-130C (which may be referred to herein individually as a user computing device 130 or collectively as the user computing devices 130) via the network 128. The network 128 may be a local-area network ("LAN"), a wide-area network ("WAN"), the Internet, or any other networking topology known in the art that connects the user computing device 130 to the 360-degree view generation system 102 or the online platform 132.

The online platform 132 includes a platform server 134 and one or more image resources, such as user generated content 106, reference image source 108, and other image sources 110. Examples of the online platform 132 can include a social media platform, a marketplace platform, or any other online platform that displays images or videos and allows users to upload images or videos. The user generated content includes user uploaded images or videos and is updated periodically on the online platform 132. The reference image source includes reference images or videos. The reference images or videos are uploaded to the online platform 132 by providers of a target object, such as a merchant. The 360-degree view generation system 102 is configured for generating a 360-degree view of a target object using available images from the one or more image sources on the online platform 132.

The 360-degree view generation system 102 includes a data store 124, a resource management engine 112, an image processing engine 104. The image processing engine 104 includes an object detection module 114, an image categorization module 116, an image aesthetics predictor module 118, a mask processing module 120, and an image stitching module 122. The resource management engine 112 is configured to extract available images from user generated content 106, reference image source 108, and other image sources 110. The available images are extracted and sent to the object detection module 114. The object detection module 114 is configured to detect the target object in the available images. In some examples, the object detection module 114 is a CNN-based machine learning model, which is trained to detect target objects in each image. The object detection module 114 is configured to label the target object, impose a bounding box around the target object in each remaining image. The object detection module 114 is also configured to filter out low quality images, such as the images in which the target object is partially visible, not visible, or blurry.

The image categorization module 116 is configured to categorize the remaining images based on the angles or view of the target object in each image. Reference images are usually taken from different angles of the target object and have a relative high quality, so the reference images can be used as base images. The image categorization module 116 is configured to compare the features of the remaining images to the features of the base images. In some examples, the image categorization module 116 implements a feature vector methodology for the comparison. When the differences between the feature vector of the target object in an image and the feature vectors of the target object in the existing base images are bigger than a predefined threshold value, the image is selected as an additional base image. This way, additional base images can be identified to represent other possible views of the target object. In the meantime, the remaining images are categorized into a set of view categories associated with various views or angles of the target object The image aesthetics predictor module 118 is configured to select a representative image for each image category. In some examples, the image aesthetics predictor module 118 is a trained CNN model. The image aesthetics predictor module 118 computes a global aesthetics score using a group of aesthetics attribute values for each image in each image category. The image with the highest score is selected as the representative image of the image category.

The representative image for each image category is then sent to the mask processing module 120. The mask processing module 120 is configured to extract an object image of the target object from each representative image. The mask processing module 120 removes redundant backgrounds in each representative image and keeps the target object only in the object images. The mask processing module 120 then scales the extracted object images to the same scale and enhance the extracted object images to make the look and feel of the object images similar to each other. The enhancement includes, for example, adjustment of lighting, such as exposure, brightness, shadows, and black point. The enhancement may also include adjustment of color vibrant, hue and saturation.

The processed object images are then sent to the image stitching module 122. The image stitching module 122 is configured to create a 360-degree view by stitching together the processed object images. The image stitching module 122 can further add some feature values to the edges to give a smoother look and adding a small amount of blur value to dissolve any artefact of the stitching of the object images.

The created 360-degree view for the target object can be stored in the data store 124. In some implementations, the created 360-degree view for the target object is uploaded and stored in a database 136 of the online platform 132. The user computing devices 130 can access the 360-degree view for the target object on the online platform 132 via the network 128. In some implementations, the 360-degree view generation system 102 can be built on the platform server 134. In some implementations, the 360-degree view generation system 102 is built on a different server and connected to the online platform 132 via an application programing interface (API). The 360-degree view of the target object can be updated periodically based on updates from the one or more image sources on the online platform 132.

FIG. 2 depicts an example of a process for generating a 360-degree view using processed object images of target object, according to certain embodiments of the present disclosure. At block 202, a 360-degree view generation system 102 identifies multiple images from one or more image sources on an online platform 132. The multiple images have the same target object therein. The one or more image sources can be user generated content 106, reference image source 108, and other image sources 110. The resource management engine 112 of the 360-degree view generation system 102 extracts available images from the one or more images sources on the online platform 132. The object detection module 114 of the image processing engine 104 in the 360-degree view generation system 102 identifies a target object in the available images extracted by the resource management engine 112. The object detection module 114 is a CNN-based machine learning model. The CNN-based machine learning model is trained to detect target objects. The object detection module 114 labels the target object, imposes a bounding box around the target object in each image. The object detection module 114 can also filter out low-quality images in which the target object is partially visible, not visible, or blurry.

At block 204, the 360-degree view generation system 102 categorizes the multiple images into multiple view categories. Reference images are usually from the provider of the target object on the online platform taken from different angles and have a relative high quality. The image categorization module 116 of the 360-degree view generation system 102 uses the reference images representing initial view categories. The image categorization module 116 categorizes the multiple images by comparing the multiple images with the initial base images. Details about categorizing the multiple images are illustrated in FIG. 3. Functions included in block 204 and FIG. 3 can be used to implement a step for categorizing multiple images into multiple view categories.

At block 206, the 360-degree view generation system 102 determines a representative image for each view category. In some examples, the image aesthetics predictor module 118 of the 360-degree view generation system 102 computes a global aesthetics score using a group of aesthetics attribute values for each image in each image category. For example, the group of aesthetics attributes include balancing element, content, color harmony, depth of field, lighting, motion blur, object emphasis, rule of thirds, vivid color, and repetition. The balancing element attribute indicates whether the image contains balanced elements. The content attribute indicates whether the image has good or interesting content The color harmony attribute indicates whether the overall color of the image is harmonious the depth of field attribute indicates whether the image has shallow depth of field. The lighting attribute indicates whether the image has good/interesting lighting. The motion blur attribute indicates whether the image has motion blur. The object emphasis attribute indicates whether the image emphasizes foreground objects. The rule of thirds attribute indicates whether the photography follows rule of thirds. The vivid color attribute indicates whether the photo has vivid color, not necessarily harmonious color. The repetition attribute indicates whether the image has repetitive patterns. Fewer or more attributes than the attributes listed here may be used to determine the global aesthetics score. The image with the highest aesthetics score is selected as the representative image of the image category.

At block 208, the 360-degree view generation system 102 extracts an object image of the target object from the representative image for each view category. The mask processing module 120 of the 360-degree view generation system 102 applies a mask of the target object to each representative image to remove redundant backgrounds and keep the target object only, thereby extracting the object image of the target object.

At block 210, the 360-degree view generation system 102 processes object images of the target object for the multiple view categories to generate multiple processed object images. In some examples, the mask processing module 120 of the 360-degree view generation system 102 scales the object images extracted from the representative images to the same scale. In some examples, the mask processing module 120 enhances each object image by adjusting exposure, brightness, shadows, black point, color vibrant, hue, saturation, etc. so that each object image has the same look and feel to each other. Functions included in block 208 and block 210 can be used to implement a step for generating multiple scaled and enhanced object images.

At block 212, the 360-degree view generation system 102 stitches the multiple processed object images to create a 360-degree view of the target object. The image stitching module 122 of the 360-degree view generation system 102 stitches the processed mask images together. The image stitching module 122 extracts keypoints in the processed object images using algorithms such as Difference to Gaussian (DoG) and Harris Corner Detector. The keypoints are spatial locations or points in an image that define what is interesting or what stand out in the image, including corner, blob, edge, etc. The image stitching module 122 then creates local invariant descriptors for the extracted keypoints using algorithms such as scale-invariant feature transform (SIFT) and speeded up robust features (SURF). In some examples, a local invariant descriptor is a feature vector describing the patch around an interest point. Each patch is described by using its local reference frame, and local descriptors are invariant respect to geometrical transformations applied to the image. The image stitching module 122 then matches local invariant descriptors from a first image to local invariant descriptors in a second image. Descriptor matching is a process of recognizing features of the same object across images with slightly different viewpoints. In some examples, matching descriptors is a two-step process. The first step is to compute the "nearest neighbors" of each descriptor in the first image with the descriptors from the second image. The distance metric could depend on the descriptor contents. The second step is to perform a "ratio test" by computing the ratio of the distance to the nearest neighbor to the distance to the second-nearest neighbor. A homography matrix is created for two matched processed images using the matched feature vectors with a random sample consensus (RANSAC) algorithm. The two matched processed object images are then warped and stitched together using the homography matrix. Similarly, other processed images can be matched, warped, and stitched together. A 360-degree view is then created. The image stitching module 122 can further add some feature values to the edges to give a smoother look and adding a small amount of blur value to dissolve any artefact of the stitching of the object images.

Turning to FIG. 3, FIG. 3 depicts an example of a process for categorizing multiple images into multiple view categories, according to certain embodiments of the present disclosure. At block 302, a 360-degree view generation system 102 identifies initial base images representing initial view categories. The initial view categories are described by angles of the target object in the initial base images, which are reference images from a provider of the target object in some examples.

At block 304, the 360-degree view generation system 102 compares feature values of the multiple images and feature values of the initial base images using a feature vector methodology. The image categorization module 116 creates a feature vector of feature values for the target object in each image. The feature values are numerical values of certain features of the target object, such as corners, edges, regions of interest points, ridges, etc. The image categorization module 116 then compares the feature vectors of the target object in each image and the feature vectors of the target object in the initial base images.

At block 306, the 360-degree view generation system 102 selects one or more images as additional base images based on differences between feature values of the one or more images and the feature values of the initial base images being higher than a predetermined threshold. The difference between the feature vector of the target object in an image and the feature vector of the target object in the existing base images is measured with a metric. Metrics for vector comparison include the Euclidean distance, Manhattan distance, or the Mahalanobis distance. When the metric is bigger than a predefined threshold value, the image is selected as an additional base image. When the metric is not bigger than the predefined threshold value, the image is categorized into an initial view category. That is, the angle of the target object is similar to the angle of the target object in one of the view categories.

At block 308, the 360-degree view generation system 102 categorizes the multiple images into the initial view categories and the additional view categories. The process of identifying additional view categories happen during the process of categorizing. Once the image categorization module 116 processes all the images, all the new categories are identified, and all the images are categorized into either the initial view categories or the additional view categories newly identified during the process of categorizing.

Figures 4, 5:
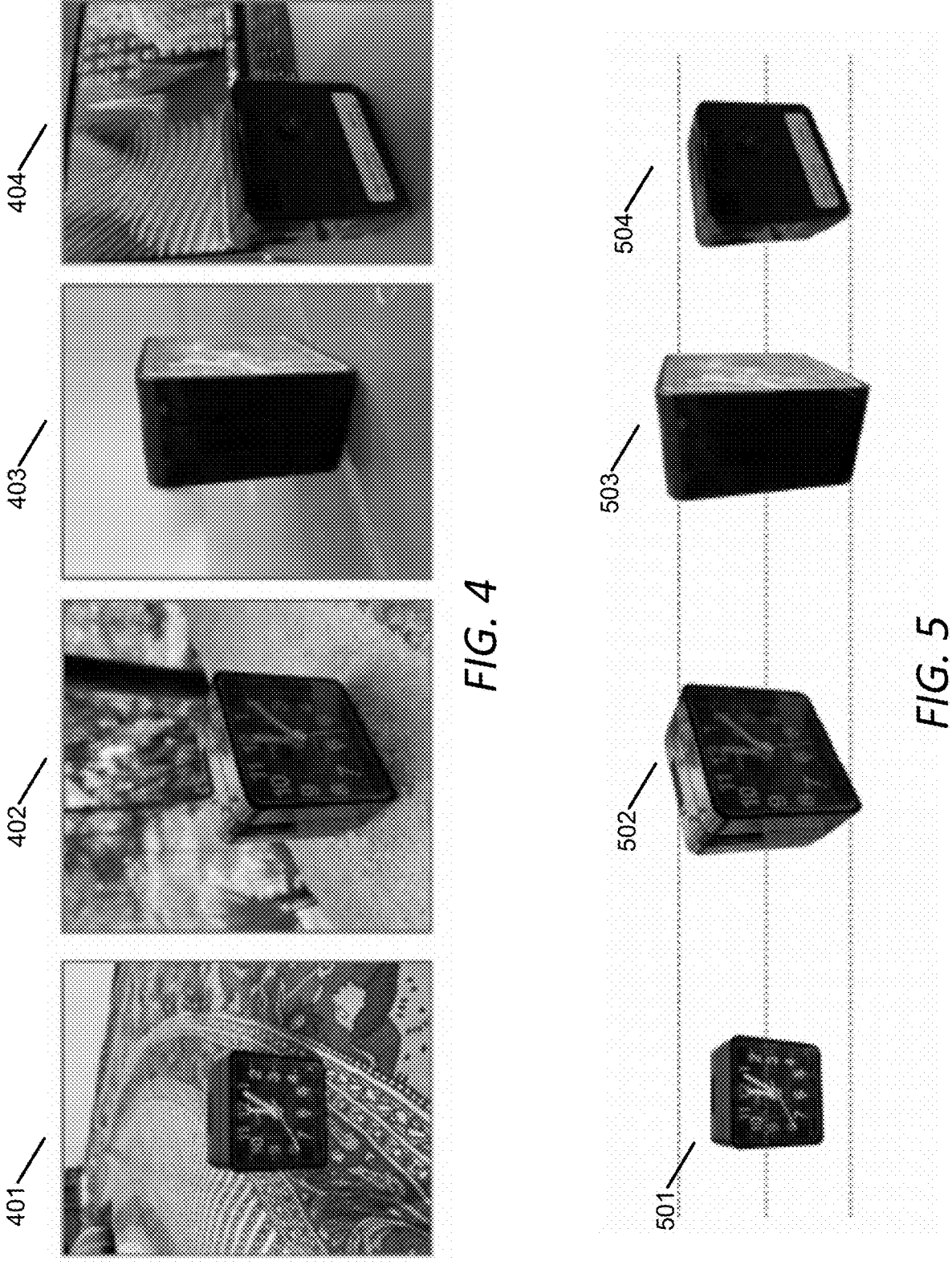
FIG. 4 depicts examples of individual images of the target object that are available on the online platform, according to certain embodiments of the present disclosure.
FIG. 5 depicts examples of extracted object images of the target object by applying masks on the individual images shown in FIG. 4, according to certain embodiments of the present disclosure.

FIGS. 4-8 illustrate examples of images used or generated during the process of generating a 360-degree view for a target object using available images on an online platform 132, according to certain embodiments of the present disclosure. Turning to FIG. 4, FIG. 4 depicts examples of individual images of the target object that are available on the online platform 132, according to certain embodiments of the present disclosure. In this example, the images are user uploaded images. Images 401-404 each include a target object, which is a clock. In some examples, images 401-404 are uploaded by users who purchased or otherwise own the clock and made them available on an online platform 132. The object detection module 114 detects the target object in these available images. The target object is labeled, and a bounding box is created around the target box. The object detection module 114 then filters out low quality images, such as images in which the object is partially visible, not visible, or blurry. The image categorization module 116 creates a view category for images taken from a similar angle or view of the target object, and thus, categorizes the images from the object detection module 114. The image aesthetics predictor module 118 then selects representative images for different view categories by evaluating aesthetic qualities for images in their respective view categories.

Turning to FIG. 5, FIG. 5 depicts examples of extracted object images of the target object by applying masks on the individual images shown in FIG. 4, according to certain embodiments of the present disclosure. The representative images from the image aesthetic predictor module 118 usually contain redundant background content. The mask processing module 120 can remove the redundant background content and extract the target object only by applying masks to the representative images. Thus, extracted object images 501-504 are created.

Figures 6, 7:
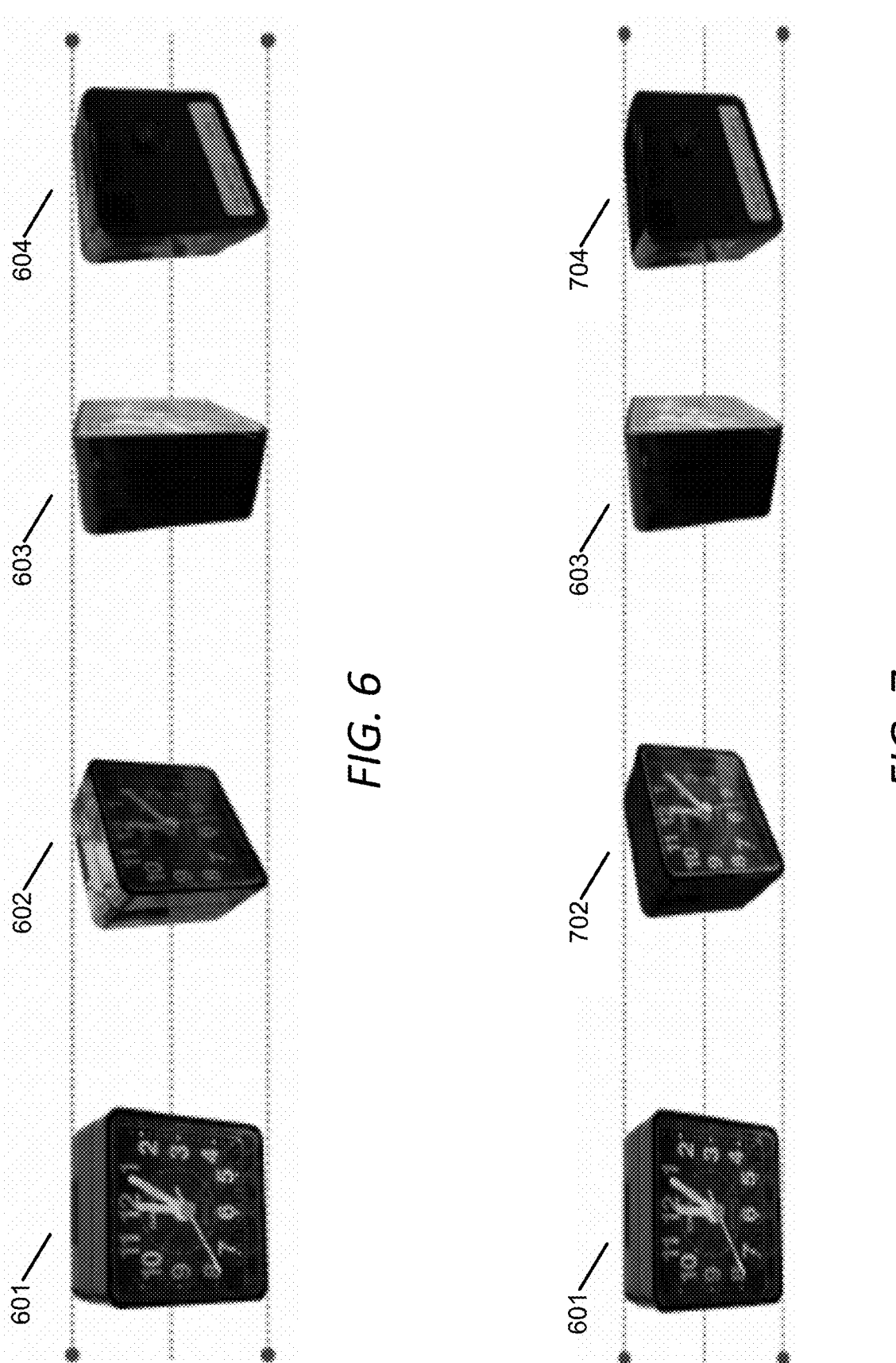
FIG. 6 depicts examples of scaled object images generated by scaling the extracted object images shown in FIG. 5 to the same scale, according to certain embodiments of the present disclosure.
FIG. 7 depicts examples of enhanced object images generated by enhancing the scaled object images shown in FIG. 6, according to certain embodiments of the present disclosure.

Turning to FIG. 6, FIG. 6 depicts examples of scaled object images generated by scaling the extracted object images shown in FIG. 5 to the same scale, according to certain embodiments of the present disclosure. The extracted object images 501-504 in FIG. 5 are not at the same scale. The mask processing module 120 can scale the extracted object images 501-504 of the clock to the same scale to generate scaled object images 601-604.

Turning to FIG. 7, FIG. 7 depicts examples of enhanced object images generated by enhancing the scaled object images shown in FIG. 6, according to certain embodiments of the present disclosure. For example, the mask processing module 120 can adjust the brightness and contrast in the scaled object image 602 to create an enhanced object image 702 which matches the other extracted object images 601 and 603. As another example, the mask processing module 120 can also adjust the reflective color in scaled object image 604 to create an enhanced object image 704 which matches the other object extracted images 601 and 603.

Figure 8:
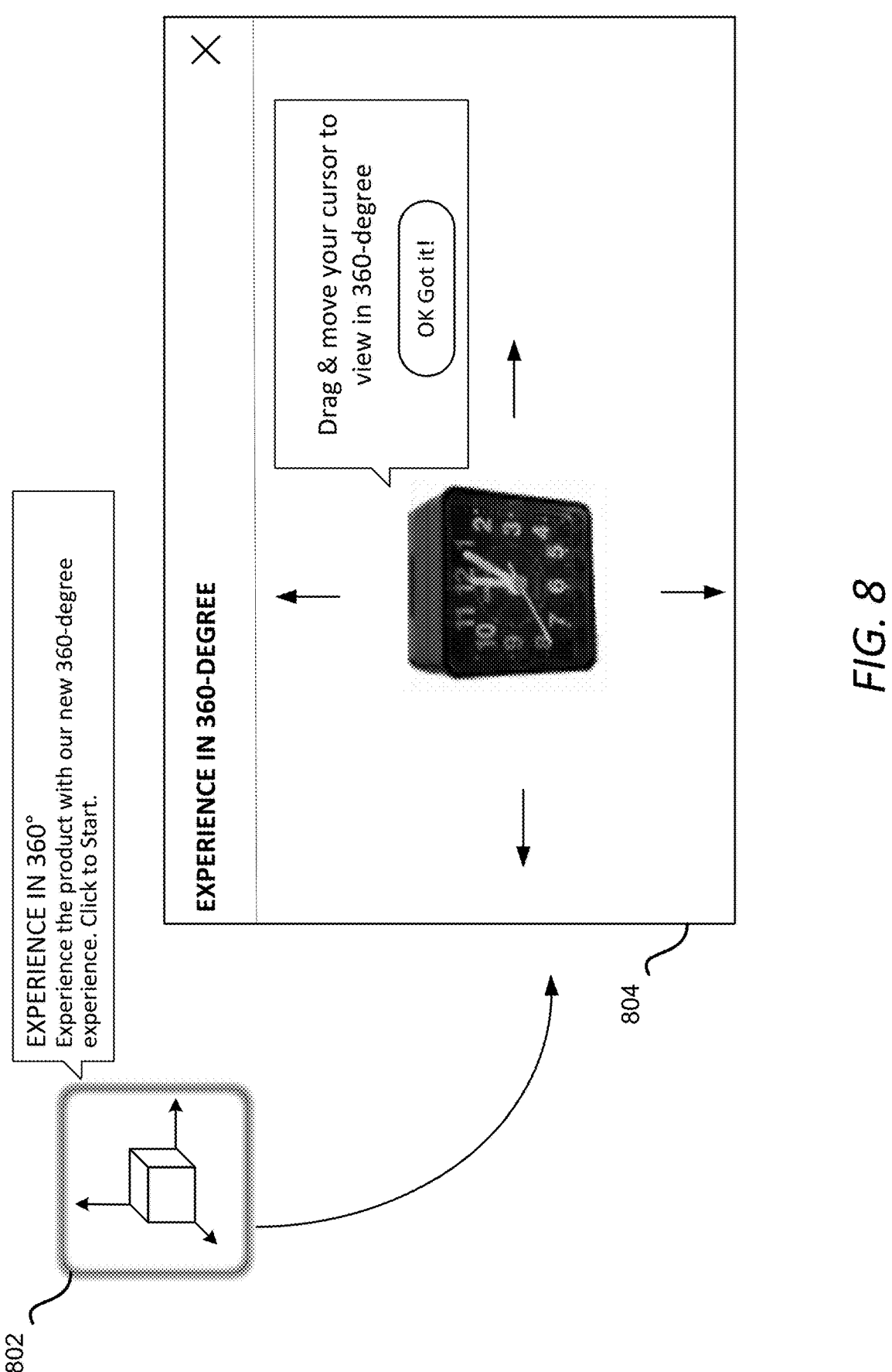
FIG. 8 depicts an example of a generated 360-degree view of the target object shown in FIGS. 4-7, according to certain embodiments of the present disclosure.

FIG. 8 depicts an example of a generated 360-degree view of the target object shown in FIGS. 4-7, according to certain embodiments of the present disclosure. The target object is a clock. In this example, the 360-degree view of the target object is pre-created and can be updated periodically. Symbol 802 indicates that a 360-degree object view is available for the target object. The symbol 802 is on a graphical user interface of a client-side application or a webpage of the online platform 132. The client-side application of the online platform is installed on a user computing device 130. The webpage of the online platform 132 can be launched in a web browser installed on the user computing device 130. Pressing or clicking the symbol 802 will launch the pre-generated 360-degree view in a popup window 804. A user can drag the object in the popup window 804 or move the cursor to view the target object in 360 degrees. In some examples, pressing or clicking the symbol 802 triggers the 360-degree view generation system 102 to generate a 360-degree view for the clock on demand.

Figure 11:
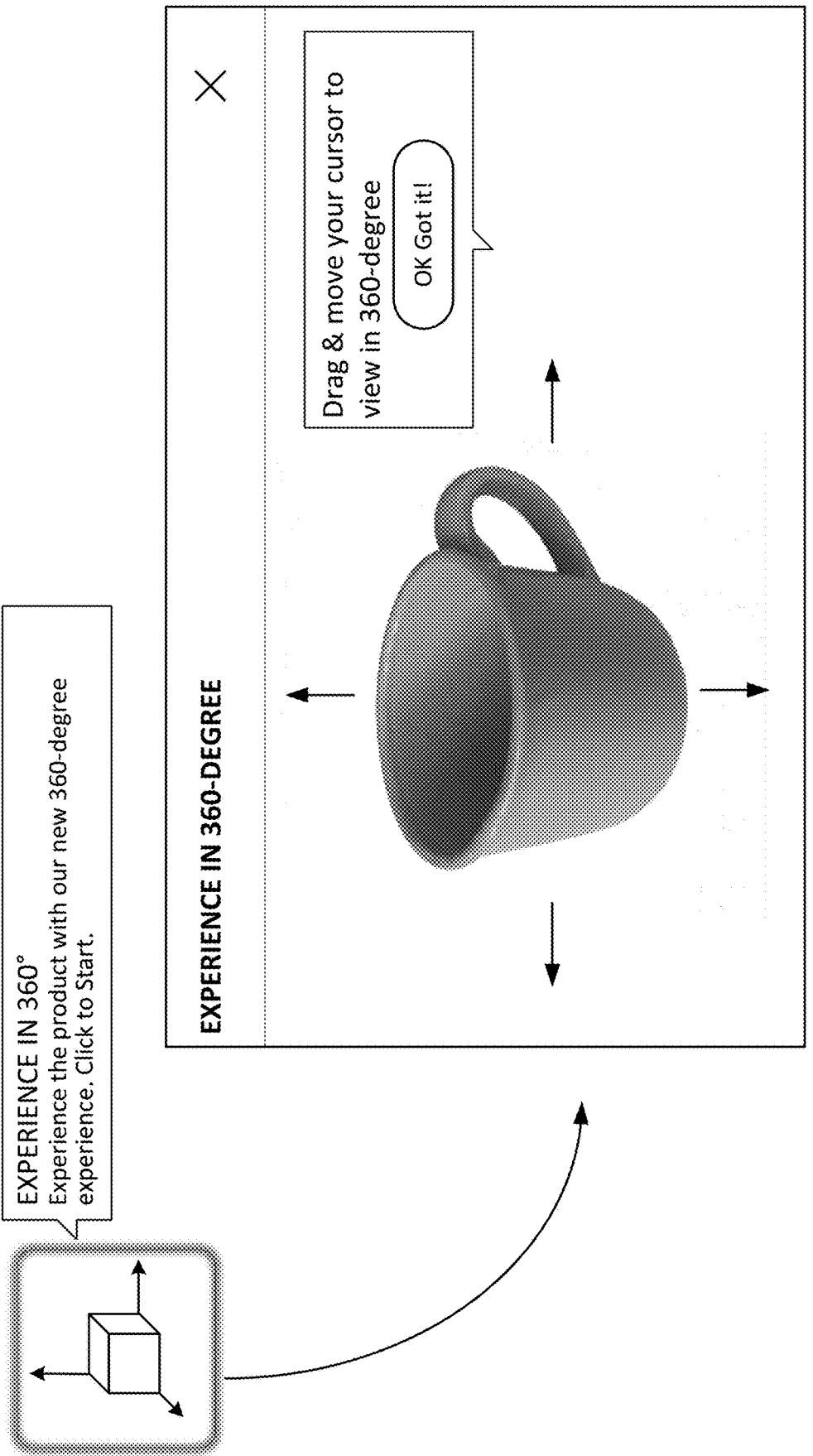
FIG. 11 depicts an example of a generated 360-degree view of a cup object, according to certain embodiments of the present disclosure.

FIGS. 9-11 illustrate examples of images involved in generating a 360-degree view for another target object using available images on an online platform 132, according to certain embodiments of the present disclosure. FIG. 9 depicts examples of extracted object images of another target object, i.e., a cup, from available images on the online platform 132, according to certain embodiments of the present disclosure. FIG. 10 depicts examples of scaled and processed object images generated by scaling and enhancing the extracted object images shown in FIG. 9, according to certain embodiments of the present disclosure. FIG. 11 depicts an example of a generated 360-degree view of the cup object, according to certain embodiments of the present disclosure.

It can be appreciated from FIGS. 4-11 that generation of a 360-degree object view does not impose any constraints on the shape of the target object. For example, the 360-degree view generation system 102 can create a 360-degree object view for both symmetric and asymmetric objects. The 360-degree object view is interactive, a user can click or drag to see different sides of the object. In some situations, the available images for the target object from the online platform include images for all sides of the target object. In other situations, the available images for the target object do not include particular views or angles, for example, the bottom of a target object. The image processing engine 104 can generate the 360-degree view without the missing views or angles by leaving the images for the missing views or angles transparent or white. As images for the missing views or angles become available, the image processing engine 104 then updates the 360-degree view to fill in the missing information.

Figure 12:
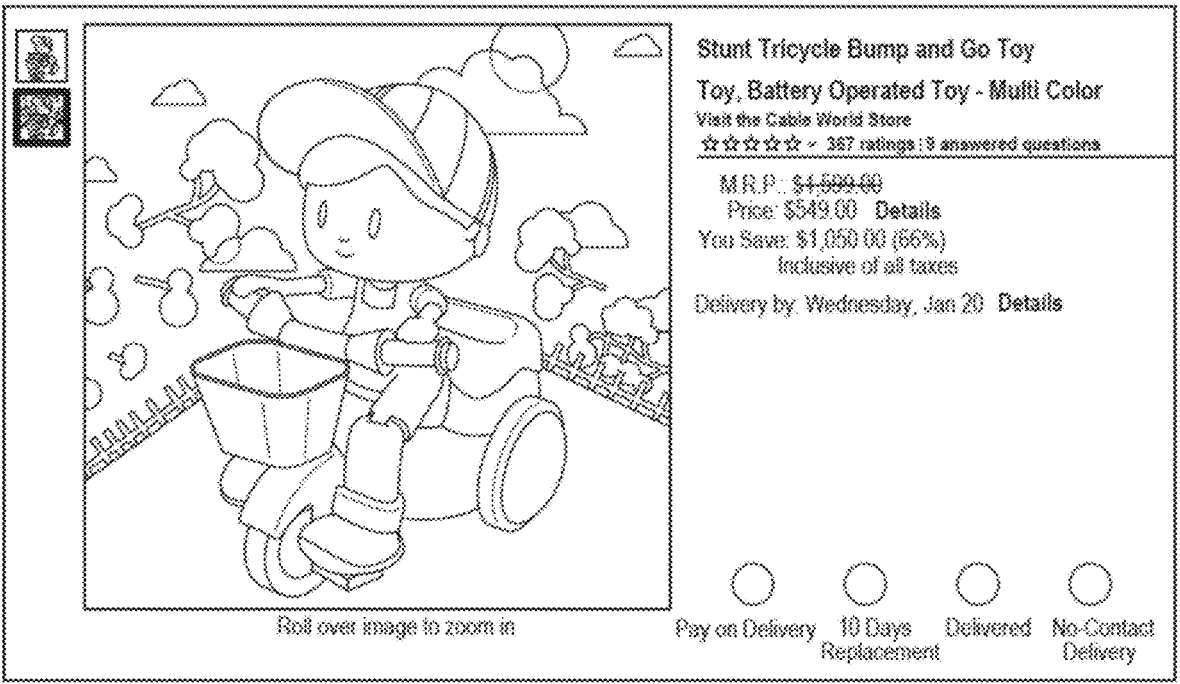
FIG. 12 depicts an example of a graphical user interface of an online platform displaying a target object without a 360-degree view, according to certain embodiments of the present disclosure.
Figure 13:
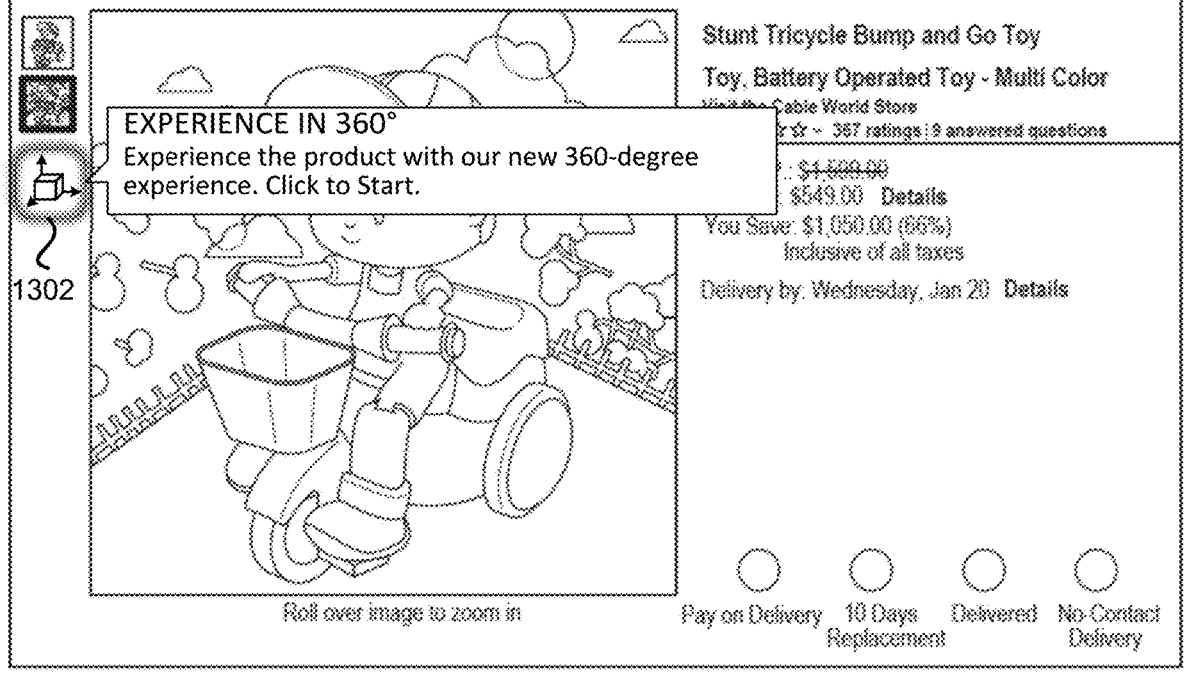
FIG. 13 depicts an example of a graphical user interface of FIG. 12 with a 360-degree view, according to certain embodiments of the present disclosure.

FIG. 12 depicts an example of a graphical user interface of an online platform 132 displaying a target object without a 360-degree view, according to certain embodiments of the present disclosure. The target object is a tricycle. The online platform 132 is a marketplace platform. The online platform 132 does not have a pre-generated 360-degree view of the tricycle. In this example, the online platform 132 does not have sufficient images to generate the 360-degree view of the tricycle. Therefore, a 360-degree view of the tricycle is not available on the user interface. Gradually, more and more images of the tricycle may become available, such as through uploaded images by users in the user review. With these images, a 360-degree view of the tricycle may be generated and made available to users. FIG. 13 depicts an example of the graphical user interface of FIG. 12 with a 360-degree view available, according to certain embodiments of the present disclosure. In this user interface, pressing or clicking the symbol 1302 triggers the 360-degree view for the target object to be displayed in the user interface.

Figure 14:
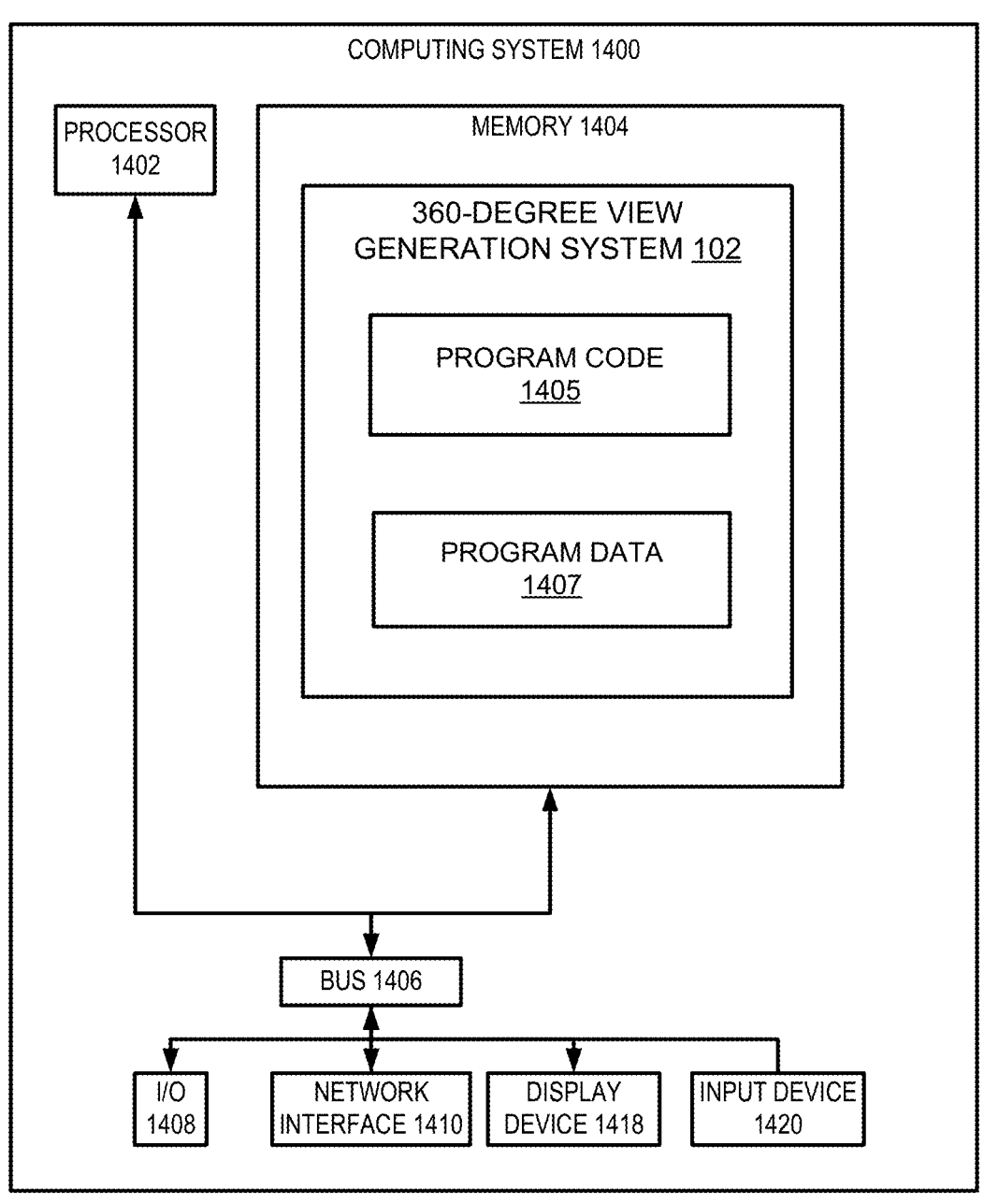
FIG. 14 depicts an example of the computing system for implementing certain embodiments of the present disclosure.

Any suitable computing system or group of computing systems can be used for performing the operations described herein. For example, FIG. 14 depicts an example of the computing system 1400 for implementing certain embodiments of the present disclosure. The implementation of computing system 1400 could be used to implement the 360-degree view generation system 102. In other embodiments, a single computing system 1400 having devices similar to those depicted in FIG. 14 (e.g., a processor, a memory, etc.) combines the one or more operations depicted as separate systems in FIG. 1.

The depicted example of a computing system 1400 includes a processor 1402 communicatively coupled to one or more memory devices 1404. The processor 1402 executes computer-executable program code stored in a memory device 1404, accesses information stored in the memory device 1404, or both. Examples of the processor 1402 include a microprocessor, an application-specific integrated circuit ("ASIC"), a field-programmable gate array ("FPGA"), or any other suitable processing device. The processor 1402 can include any number of processing devices, including a single processing device.

A memory device 1404 includes any suitable non-transitory computer-readable medium for storing program code 1405, program data 1407, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 1400 executes program code 1405 that configures the processor 1402 to perform one or more of the operations described herein. Examples of the program code 1405 include, in various embodiments, the application executed by the resource management engine 112 to extract available images of a target object from an online platform, the application executed by the image processing engine 104 to generate a 360-degree view of the target object using the available images extracted by the resource management engine 112 from the online platform, or other suitable applications that perform one or more operations described herein. The program code may be resident in the memory device 1404 or any suitable computer-readable medium and may be executed by the processor 1402 or any other suitable processor.

In some embodiments, one or more memory devices 1404 stores program data 1407 that includes one or more datasets and models described herein. Examples of these datasets include extracted images, feature vectors, aesthetic scores, processed object images, etc. In some embodiments, one or more of data sets, models, and functions are stored in the same memory device (e.g., one of the memory devices 1404). In additional or alternative embodiments, one or more of the programs, data sets, models, and functions described herein are stored in different memory devices 1404 accessible via a data network. One or more buses 1406 are also included in the computing system 1400. The buses 1406 communicatively couples one or more components of a respective one of the computing system 1400.

In some embodiments, the computing system 1400 also includes a network interface device 1410. The network interface device 1410 includes any device or group of devices suitable for establishing a wired or wireless data connection to one or more data networks. Non-limiting examples of the network interface device 1410 include an Ethernet network adapter, a modem, and/or the like. The computing system 1400 is able to communicate with one or more other computing devices (e.g., a user computing device 130) via a data network using the network interface device 1410.

The computing system 1400 may also include a number of external or internal devices, an input device 1420, a presentation device 1418, or other input or output devices. For example, the computing system 1400 is shown with one or more input/output ("I/O") interfaces 1408. An I/O interface 1408 can receive input from input devices or provide output to output devices. An input device 1420 can include any device or group of devices suitable for receiving visual, auditory, or other suitable input that controls or affects the operations of the processor 1402. Non-limiting examples of the input device 1420 include a touchscreen, a mouse, a keyboard, a microphone, a separate mobile computing device, etc. A presentation device 1418 can include any device or group of devices suitable for providing visual, auditory, or other suitable sensory output. Non-limiting examples of the presentation device 1418 include a touchscreen, a monitor, a speaker, a separate mobile computing device, etc.

Although FIG. 14 depicts the input device 1420 and the presentation device 1418 as being local to the computing device that executes the 360-degree view generation system 102, other implementations are possible. For instance, in some embodiments, one or more of the input device 1420 and the presentation device 1418 can include a remote client-computing device that communicates with the computing system 1400 via the network interface device 1410 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

That which is claimed is:

1. A method in which one or more processing devices perform operations comprising:

identifying, by an object detection module of a 360-degree view generation system, a plurality of images depicting a same target object from one or more image sources on an online platform, wherein the one or more image sources comprises user generated content on the online platform;

categorizing, by an image categorization module of the 360-degree view generation system, the plurality of images into a plurality of view categories;

determining, by an image aesthetics predictor module of the 360-degree view generation system, a representative image for each view category of the plurality of view categories;

extracting, by a mask processing module of the 360-degree view generation system, an object image of the target object from the representative image for each view category to obtain a plurality of object images of the target object for the plurality of view categories;

processing, by the mask processing module, the plurality of object images of the target object for the plurality of view categories to generate a plurality of processed object images, wherein said processing comprises:

scaling the plurality of object images for the plurality of view categories to a predetermined scale to create a plurality of scaled object images with the same scale; and adjusting a plurality of attributes of the plurality of scaled object images to respective predetermined values to create a plurality of scaled and enhanced object images with the same attribute values corresponding to the plurality of attributes; and stitching, by an image stitching module of the 360-degree view generation system, the plurality of scaled and enhanced object images to create a 360-degree view of the target object.

2. The method of claim 1, wherein the user generated content is uploaded and updated periodically.

3. The method of claim 1, wherein identifying the plurality of images from the one or more image sources on the online platform comprises identifying, by the object detection module, the plurality of images from the one or more image sources on the online platform using a Convolutional Neural Network (CNN)-based objection detection model.

4. The method of claim 1, wherein categorizing the plurality of images into one or more view categories comprises:

identifying, by the image categorization module, initial base images, wherein the initial base images represent one or more initial view angles;

comparing, by the image categorization module, feature values of the plurality of images to feature values of the initial base images;

selecting, by the image categorization module, an image from the plurality of images as an additional base image based on a difference between a feature value of the image and respective feature values of the initial base images being higher than a predetermined threshold, wherein the additional base image represents an additional view angle; and categorizing, by the image categorization module, the plurality of images into a plurality of view angles comprising the one or more initial view angles and the additional view angle.

5. The method of claim 4, wherein the one or more image sources further comprise merchant uploaded images on the online platform, wherein the initial base images are merchant uploaded images.

6. The method of claim 1, wherein determining the representative image for each view category of the plurality of view categories comprises calculating, by the image aesthetics predictor module, a global quality score for each image from the view category using a deep-learning-based image aesthetics predictor model, wherein the representative image has a maximum quality score in the view category.

7. The method of claim 1, wherein the plurality of attributes comprises exposure attributes, brightness attributes, and shadow attributes.

8. The method of claim 1, further comprising:

refining, by the image stitching module, one or more edges of the 360-degree view of the target object by adding one or more feature values; and dissolving, by the image stitching module, one or more artefacts of the 360-degree view of the target object by adding one or more blur values.

9. The method of claim 1, further comprising:

storing, by the 360-degree view generation system, the 360-degree view of the target object on the online platform; and updating, by the 360-degree view generation system, the 360-degree view of the target object periodically based on updates from the one or more image sources on the online platform.

10. The method of claim 1, wherein the online platform is a social media platform or a marketplace platform.

11. A system, comprising:

an object detection module configured to identify a plurality of images depicting a same target object from one or more image sources on an online platform, wherein the one or more image sources comprises user gener-
ated content on the online platform;
an image categorization module configured to categorize
the plurality of images into a plurality of view catego-
ries;
an image aesthetics predictor module configured to deter-
mine a representative image for each view category of
the plurality of view categories;
a mask processing module configured to generate a plu-
rality of processed object images of the target object
from representative images for the plurality of view
categories, wherein generating a plurality of processed
object images of the target object from representative
images for the plurality of view categories comprises:
    extracting an object image of the target object from the
        representative image for each view category to
        obtain a plurality of object images of the target object
        for the plurality of view categories;
    scaling the plurality of object images for the plurality of
        view categories to a predetermined scale to create a
        plurality of scaled object images with the same scale;
        and
    adjusting a plurality of attributes of the plurality of
        scaled object images to respective predetermined
        values to create a plurality of scaled and enhanced
        object images with the same attribute values corre-
        sponding to the plurality of attributes;
an image stitching module configured to stitch the plu-
rality of scaled and enhanced object images to create a
360-degree view of the target object; and
a data store configured to store the 360-degree view of the
target object,
wherein the 360-degree view of the target object is
periodically updated based on updates from the one or
more image sources on the online platform.
12. The system of claim 11, wherein the image categori-
zation module is further configured to:
    identify initial base images, wherein the initial base
        images represent one or more initial view angles;
    compare feature values of the plurality of images and
        those of the initial base images;
    select an image from the plurality of images as an
        additional base image when a difference between a
        feature value of the image and respective feature values
        of the initial base images is higher than a predetermined
        threshold, wherein the additional base image represents
        an additional view angle; and
    categorize the plurality of images into the plurality of
        view categories, wherein the plurality of view catego-
        ries correspond to a plurality of view angles comprising
        the one or more initial view angles and the additional
        view angle.
13. The system of claim 12, wherein the one or more
image sources comprise merchant uploaded images on the
online platform, wherein the initial base images are mer-
chant uploaded images.

14. The system of claim 11, wherein the user generated
content is uploaded and updated periodically.
15. The system of claim 11, wherein the object detection
module is configured to identify the plurality of images
using a Convolutional Neural Network (CNN)-based objec-
tion detection model.
16. The system of claim 11, wherein the image stitching
module is further configured to:
    refine one or more edges of the 360-degree view of the
        target object by adding one or more feature values; and
    dissolve one or more artefacts of the 360-degree view of
        the target object by adding one or more blur values.
17. A non-transitory computer-readable medium storing
executable instructions, which when executed by a process-
ing device, cause the processing device to perform opera-
tions comprising:
    identifying a plurality of images depicting a same target
        object from one or more image sources on an online
        platform, wherein the one or more image sources
        comprises user generated content on the online plat-
        form;
    a step for categorizing the plurality of images into a
        plurality of view categories;
    determining a representative image for each view cat-
        egory of the plurality of view categories;
    generating a plurality of scaled and enhanced object
        images, comprising:
        extracting an object image of the target object from the
            representative image for each view category to
            obtain a plurality of object images of the target object
            for the plurality of view categories,
        scaling the plurality of object images for the plurality of
            view categories to a predetermined scale to create a
            plurality of scaled object images with the same scale,
            and
        adjusting a plurality of attributes of the plurality of
            scaled object images to respective predetermined
            values to create a plurality of scaled and enhanced
            object images with the same attribute values corre-
            sponding to the plurality of attributes; and
    stitching the plurality of scaled and enhanced object
        images to create a 360-degree view of the target object.
18. The non-transitory computer-readable medium of
claim 17, wherein the operation of determining the repre-
sentative image for each view category of the plurality of
view categories comprises calculating a global quality score
for each image from each view category using a deep-
learning-based image aesthetics predictor model, wherein
the representative image for each view category has a
maximum quality score in each view category.
19. The non-transitory computer-readable medium of
claim 17, wherein the operations further comprise:
    refining one or more edges of the 360-degree view of the
        target object by adding one or more feature values; and
    dissolving one or more artefacts of the 360-degree view of
        the target object by adding one or more blur values.

* * * * *